United States Patent [19]

Okuyama et al.

[11] Patent Number: 5,729,070
[45] Date of Patent: Mar. 17, 1998

[54] COMMUTATOR ASSEMBLY FOR SMALL MOTOR, METHOD FOR PRODUCING THE SAME, AND COMMUTATOR PIECE JOINT BODY FOR THE SMALL MOTOR

[75] Inventors: Toshihide Okuyama; Kenji Tabata; Masahiro Kaneko; Morimasa Tsuzuki, all of Sayama, Japan

[73] Assignee: Sayama Precision Industries Co., Ltd., Sayama, Japan

[21] Appl. No.: 413,407

[22] Filed: Mar. 30, 1995

[30] Foreign Application Priority Data

Mar. 31, 1994 [JP] Japan .................. 6-062438

[51] Int. Cl.$^6$ .................. H01R 39/16; H01R 39/52
[52] U.S. Cl. .................. 310/235; 310/43
[58] Field of Search .................. 310/235, 43, 233, 310/234

[56] References Cited

U.S. PATENT DOCUMENTS

1,631,461  12/1927  Bonsieur .................. 310/235
3,708,872  1/1973  Ohuchi et al. .................. 29/597
4,195,242  3/1980  Mabuchi .................. 310/239
5,157,229  10/1992  Gerlach .................. 310/237

*Primary Examiner*—Thomas M. Dougherty
*Assistant Examiner*—Jonathan Link
*Attorney, Agent, or Firm*—Oblon, Spivak, McClelland, Maier & Neustadt, P.C.

[57] ABSTRACT

A commutator assembly includes a plurality of commutator pieces for supplying an electric current from a brush fixed at a motor housing to a coil rotating together with a rotor shaft of a small motor, and a commutator holder of a plastic material fixed to the rotor shaft for supporting the commutator pieces. The commutator pieces are cut out of a commutator piece joint body which has a plurality of commutator pieces radially extending from a single temporary connection and is molded into the commutator holder during molding process.

7 Claims, 10 Drawing Sheets

COMMUTATOR ASSEMBLY FOR SMALL MOTOR, METHOD FOR PRODUCING THE SAME, AND COMMUTATOR PIECE JOINT BODY FOR THE SMALL MOTOR

BACKGROUND OF THE INVENTION

1. Field of the Invention

This invention relates to a commutator assembly for a small motor, comprising a plurality of commutator pieces for supplying an electric current from a brush fixed to a motor housing to a coil to be rotated together with the rotor shaft of the small motor, and a commutator holder of a plastic material fixed to the rotor shaft for supporting the commutator pieces, to a method for producing the same, and to a commutator piece joint body for the small motor.

2. Description of the Prior Art

In basic DC motors, an electric current is supplied to the coil through brushes in contact with the commutator piece on the rotor shaft while switching the polarities of the electric current, to thereby continuously rotate the rotor shaft. Such DC motors are now in wide use since they can be produced inexpensively and easily. However, such DC motors have been subject to continuous improvement to increase the efficiency and to decrease the size. Particularly, recent studies of permanent magnet materials have greatly contributed to reduction of motor size and increased output power.

Size-reduced motors are widely used in all industrial applications and at present, particularly in portable instruments. For example, in portable instruments such as pagers and other portable time pieces, such motors are utilized as a vibrating motor for indicating the reception of a calling signal or as a source of alarm vibration. Such portable instruments are usually required to be reduced in thickness as much as possible. Because pagers and other alarm vibration sources are to be located in intimate contact with the body of a user to provide a certain alarm, they must have sufficient thinness to be received in a pocket of the user's clothing.

The improvement of such small-sized brush motors in the prior art are mainly directed to reducing the thickness of the rotor and/or stator. Improved motors have been proposed in Japanese Patent Application Nos. Hei 5-42322 and 5-135745.

As the thickness of the motors approaches the limit, which is several millimeters in recent years, it is also required to reduce the commutators in size, in addition to the rotor and stators.

In the prior art commutator assembly, three commutator pieces are fixedly held on the rotor shaft through a commutator holder, thereby achieving reliable contact of the brushes to the commutator pieces. To reduce the size of such a commutator assembly comprising the commutator pieces and the commutator holder, each of the commutator pieces is integrally insert-molded into the commutator holder made of plastic. In this case, it is required to hold a plurality of commutator pieces which project into the interior of the mold. As a result, in the case of the small commutator pieces, the commutator pieces cannot be held fixedly enough.

To remedy the above problems, the present applicant has proposed a method for producing a commutator for a small motor disclosed in Japanese Patent Application No. Hei 5-301235. In this method, a metal sheet is punched to form a plurality of commutator pieces extending inwardly from an annular thin plate to the center. In this case, a part of the thin plate is kept connected to the metal sheet. Then, the commutator pieces are formed by bending, and thereafter, are pulled toward the center of the annular shape. The deformation of the annular thin plate causes the inward movement of the commutator pieces toward the center. As a result, a plurality of commutator pieces, which are connected to one another and positioned, are subjected to the insert-molding process. The workability is improved to bring the reduction in cost. On the other hand, the reduction in the size of the commutator assembly would be limited to secure the strength of the commutator pieces against the inward pulling force.

SUMMARY OF THE INVENTION

Accordingly, the object of the present invention is to provide a commutator assembly for a small motor capable of easily producing the small-sized commutator assembly by a simple mold structure. It is another object of the present invention is to provide a method for producing the same, and a commutator pieces joint body for the small motor.

According to the first aspect of the invention, there is provided a commutator assembly for a small motor, comprising a plurality of commutator pieces for supplying an electric current from a brush fixed to a motor housing to a coil to be rotated together with the rotor shaft of the small motor, and a commutator holder of a plastic material fixed to the rotor shaft for supporting the commutator pieces, wherein said commutator pieces are cut out of a commutator piece joint body which has the commutator pieces radially extending from a single temporary connection and is molded into the commutator holder during a molding process.

With the first aspect of the invention, a plurality of commutator pieces are integrally connected by the single temporary connection when the commutator pieces are insert-molded into the commutator holder, so that it is very easy to set the commutator pieces in the mold. Also, even when the commutator assembly is made small, an insulation gap between the adjacent commutator pieces can be set quite precisely.

The second aspect of the invention provides a commutator piece joint body to be cut to form commutator pieces for supplying an electric current to a coil on a rotor shaft of a small motor from a brush fixed to a motor housing, the commutator pieces being molded into a commutator holder fixed to the rotor shaft, the commutator piece joint body comprising a single temporary connection and a plurality of commutator pieces radially extending from the single temporary connection, the commutator piece joint body being molded into the commutator holder through the molding process, and the single temporary connection being cut away from commutator pieces after the completion of the molding process to form the commutator pieces electrically separated from one another.

With the second aspect of the invention, a commutator piece joint body having a plurality of commutator pieces connected to each other is insert-molded into the commutator holder, so that it is very easy to set the commutator pieces in the mold. Also, even when the commutator assembly is made small, an insulation gap between the adjacent commutator pieces can be set quite precisely.

The third aspect of the invention provides a method for producing a commutator assembly for a small motor, comprising a step of bending a commutator piece joint body having a plurality of commutator pieces radially extending from a single temporary connection to raise the commutator pieces from the single temporary connection, a step of setting the commutator piece joint body with the commutator pieces raised in a mold and pouring a plastic material into the mold to form a commutator holder into which the commutator piece joint body is molded, and a step of cutting off the temporary connection from each commutator piece after completion of the molding process.

With the third aspect of the invention, a commutator piece joint body with a plurality of commutator pieces connected to each other is insert-molded into the commutator holder, so that it is very easy to set the commutator pieces in the mold. As a result, the production of the small commutator assembly can be facilitated.

The other objects, features and advantages of the invention will be apparent from the following description of preferred embodiments with reference to the attached drawings.

DESCRIPTION OF THE PREFERRED EMBODIMENTS

The preferred embodiments of the invention will be described with reference to the attached drawings.

Figure 1:
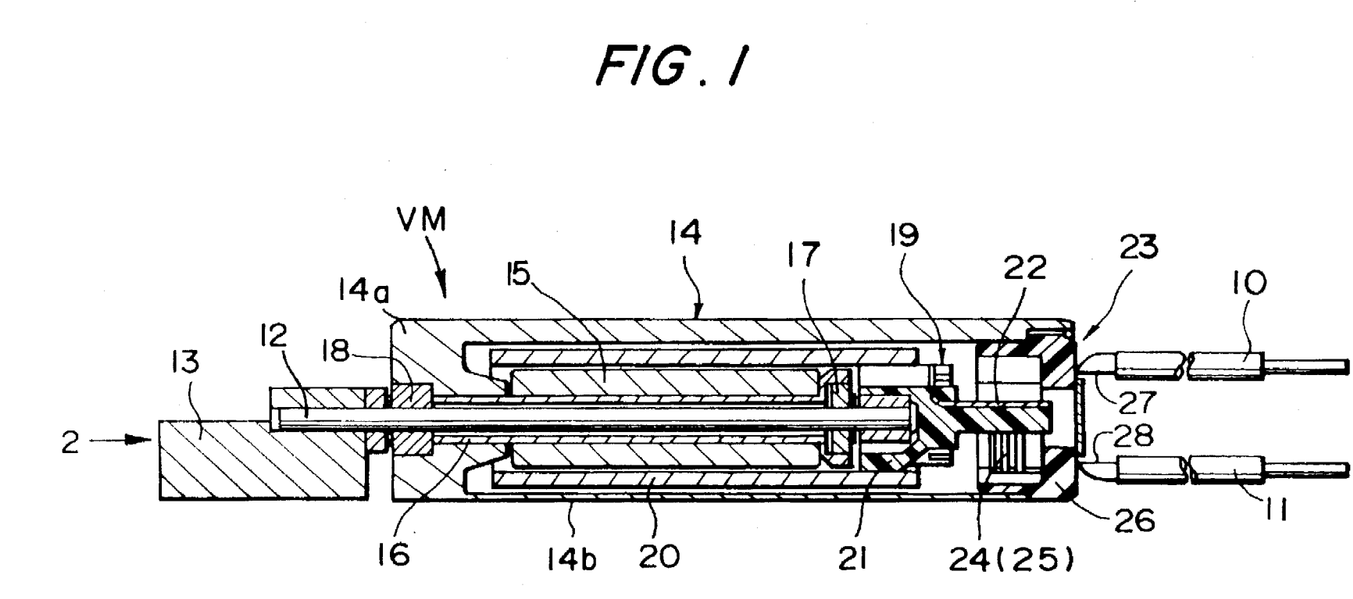
FIG. 1 is a sectional view of the essential portion of a small DC motor for a pager provided with a commutator assembly of the present invention.
Figure 2:
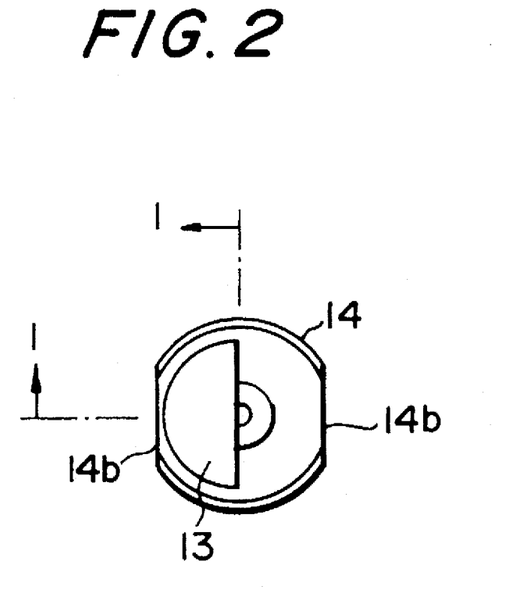
FIG. 2 is an end view of the motor in the direction of the arrow 2 in FIG. 1.

FIGS. 1 and 2 show an embodiment of a vibration motor for a pager in which a commutator assembly of the present invention is incorporated. The vibration motor VM is incorporated in a pager (not shown) and adapted to vibrate the entire pager to indicate the receipt of a calling signal to a user. An electric current is supplied to the pager vibration motor VM from an external battery or the like (not shown) through leads 10 and 11. When a rotor shaft 12 is energized and rotated by the supplied current, an eccentric weight 13 of semi-circular cross-section (see FIG. 2) fixedly mounted on the rotor shaft 12 at its protruding end is rotated at a position offset from the axis of the rotor shaft 12. This generates a vibration.

The vibration motor VM comprises a cylindrical motor housing 14 having one closed end 14a. The outer periphery of the motor housing 14 includes sliced faces 14b, 14b formed therein to reduce the thickness of the pager, as shown more clearly in FIG. 2.

In the motor housing 14 a magnet holder 16 is disposed for supporting a permanent magnet 15. The magnet holder 16 is press fitted, at one end, into a closed end 14a of the motor housing 14 and extends in the axial direction. The permanent magnet 15 is formed into a tubular configuration and fixedly mounted on the outer periphery of the magnet holder 16. The motor housing 14 and the magnet holder 16 are made of a magnetic material. A DC brush motor stator is constituted by the motor housing 14, the magnet holder 16 and the permanent magnet 15.

The rotor shaft 12 extends through the magnet holder 16. The end of the rotor shaft 12 positioned inside the motor housing 14 is rotatably supported by the leading end of the magnet holder 16 through a bearing 17 while the opposite or protruding end of the rotor shaft 12 is rotatably supported by the closed end 14a of the motor housing 14 through a bearing 18.

The inner portion end of the rotor shaft 12 includes a cylindrical coil 20 integrally connected thereto through a commutator assembly 19. The coil 20 is rotatable in a cylindrical space defined between the inner wall of the motor housing 14 and the permanent magnet 15. The commutator assembly 19 comprises a commutator holder 21 made of an insulating plastic material and commutator pieces 22 insert-molded into the commutator holder 21, as will be described later. In this embodiment, three commutator pieces 22 insulated from one another are electrically connected to three rotor coils in sequence. Thus, a rotor is constituted by the rotor shaft 12, the commutator assembly 19 and the coil 20.

The other or open end of the motor housing 14 fixedly supports a brush assembly 23. The brush assembly 23 includes a pair of brushes 24 and 25 sequentially brought into contact with the commutator pieces 22, and a brush holder 26 for supporting the brushes 24 and 25. The brush holder 26 is made of an insulating plastic material. The two brushes 24 and 25 are insert-molded into the brush holder 26. When the rotor is rotated, the brushes 24 and 25 can sequentially supply the DC power to the respective rotor coils while switching the plarities thereof. The brushes 24 and 25 receive an electric current from the leads 10 and 11 through lead terminals 27 and 28.

As described above, the vibration motor to which this embodiment is applied is of a thin structure, as if the motor itself is extended in the longitudinal direction, the external diameter thereof being reduced, e.g., to 4 mm or less between the sliced faces 14b, 14b. It is therefore required to produce the commutator assembly 19 applicable to such a thin motor in a simple manner.

Figure 3:
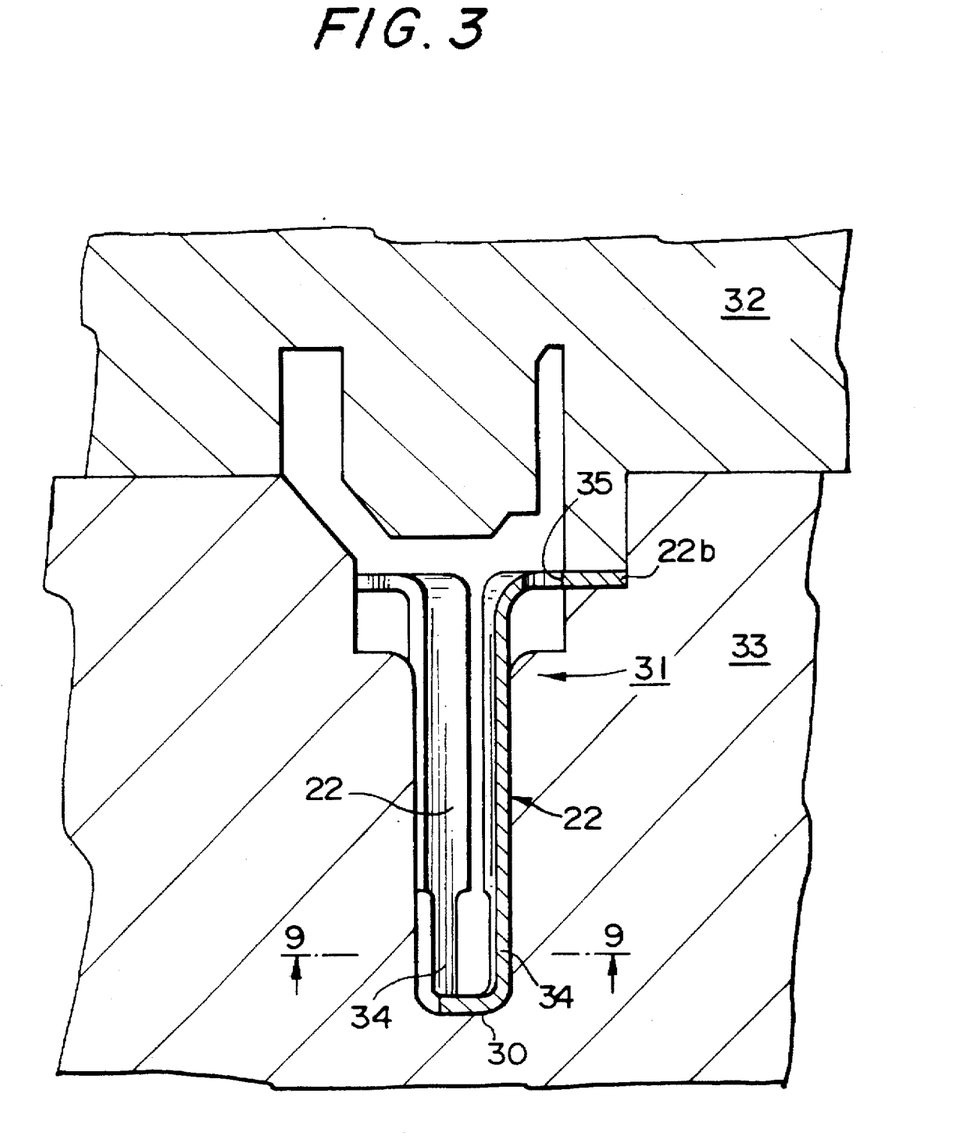
FIG. 3 is a sectional view of a mold in which a commutator piece joint body of the present invention is set.

Next, a method for producing the commutator assembly 19 according to the present invention will be described. According to the present invention as shown in FIG. 3, the method comprises steps of setting, in upper and lower molds 32 and 33, a commutator piece joint body 31 with a plurality of commutator pieces 22 raised from a single temporary connection 30, and pouring a molten plastic material into the upper and lower molds 32 and 33 to form the commutator holder 21 into which the commutator piece joint body 31 is molded.

Figure 4:
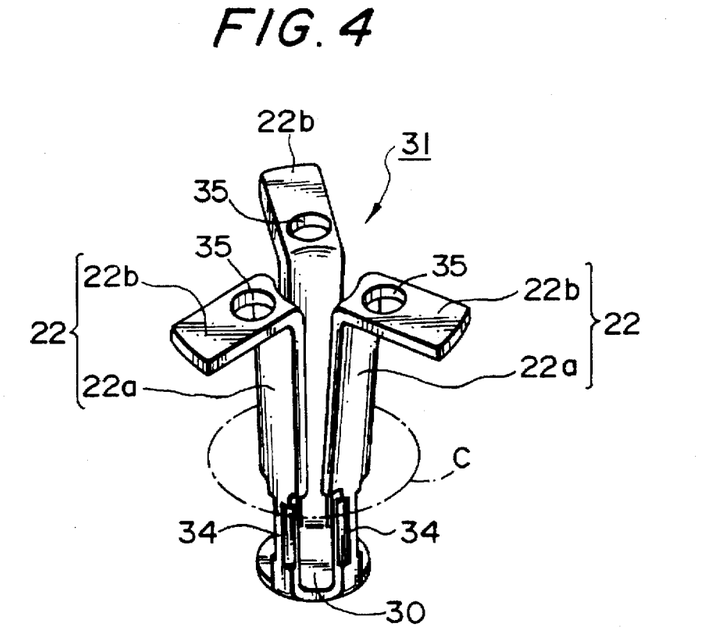
FIG. 4 is a schematic perspective view of the commutator piece joint body.
Figure 6:
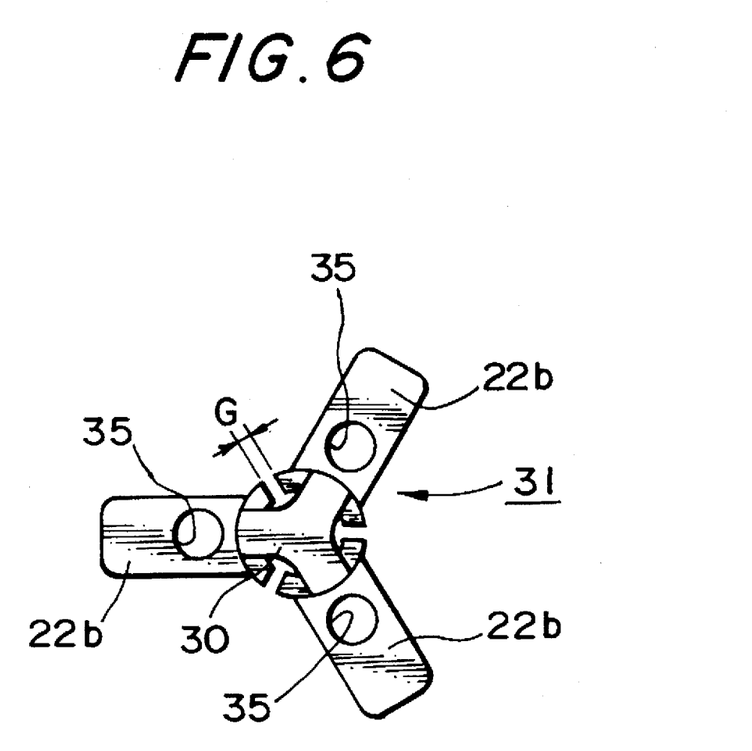
FIG. 6 is a bottom view of the commutator piece joint body.

As shown in FIGS. 4 and 6, the commutator piece joint body 31 comprises a single temporary connection 30, and a plurality of commutator pieces 22 radially extending from the single temporary connection 30. Each commutator piece 22 is connected to the temporary joint 30 through a narrow section 34. The commutator pieces 22 are raised from the temporary connection 30 by bending between the narrow section 34 and the temporary connection 30.

Each commutator piece 22 includes a contact section 22a coming into contact with the brushes 24 and 25, and a terminal section 22b formed at the free end of the contact section 22a. The contact section 22a is curved so as to come in close contact with the inner wall of the cylindrical lower mold 33 when placed in the mold 33. The curvature provides a smooth contact of the commutator pieces 22 with the brushes 24 and 25 when the commutator assembly 19 rotates. In the commutator assembly 19, the adjacent commutator pieces 22 are required to be insulated from each other. In particular, at the contact section 22a, a gap between the commutator pieces 22 is desired to be as small much as possible in order to make the commutator assembly 19 compact while insuring the insulation between the adjacent commutator pieces 22. As shown in FIG. 6, this embodiment reduces a gap G from a conventional 0.3 mm to 0.1 mm. This tiny gap G can be attained by strictly maintaining a dimensional accuracy between the commutator pieces 22 by virtue of the temporary connection 30.

The terminal section 22b is bent outward at the end of the contact section 22a. The terminal section 22b is provided with an opening 35 for allowing the molten plastic material to flow through when the commutator piece joint body 31 is molded in the commutator holder 21. The opening 35 serves to prevent heat conductivity when the terminals of the coil are soldered to the terminal section 22b.

Figure 7:
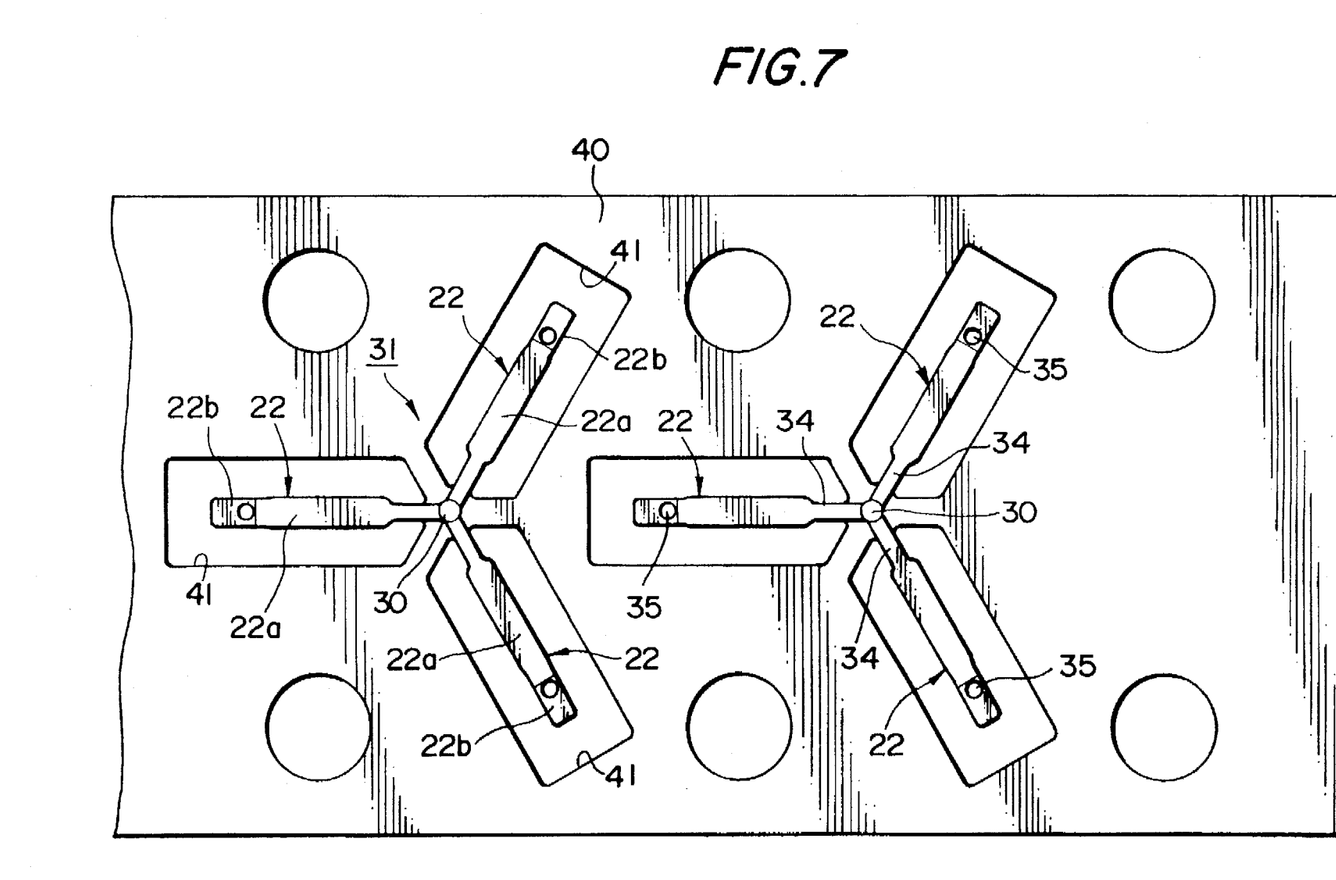
FIG. 7 is a plan view of a commutator material sheet from which the commutator piece joint body is punched out.

As shown in FIG. 7, the commutator piece joint body 31 is punched out from a commutator material sheet 40 made of a phosphor bronze strip with a thickness of, e.g., about 120 micrometers. First, pilot bores are formed by punching at certain intervals in the material sheet 40. With reference to the pilot bores, windows 41 are perforated along the outer configurations of the respective sets of three commutator pieces 22. When the windows 41 are perforated, the aforementioned opening 35 is also formed in the free end of each commutator piece 22.

Figure 8:
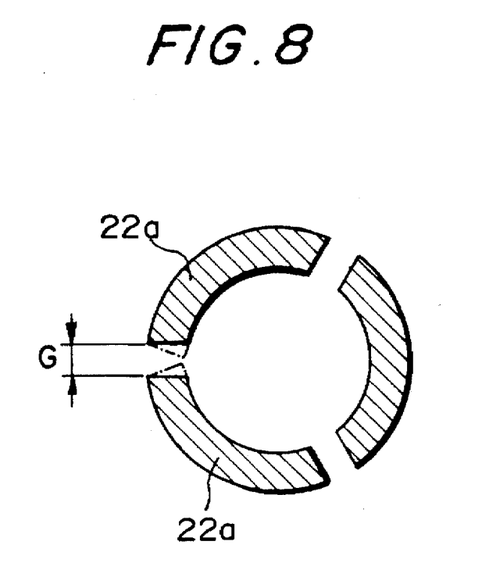
FIG. 8 is a sectional view taken along line 8—8 in FIG. 5.

Then, each commutator piece 22 is subjected to a first face-pressing operation. If the raw contact section 22a of the commutator piece 22 with the window 41 is subjected to the curvature, the gap G of a uniform width cannot be obtained between the adjacent commutator pieces 22 as indicated by a chain line in FIG. 8. The inner sides of the contact sections 22a may contact each other when the contact sections 22a are raised from the temporary connection 30. The first face-pressing operation trims the inner sides of the contact sections 22, making it possible to obtain the gap G having a uniform width. As a result, the commutator piece joint body 31 can be made more compact.

Figure 9:
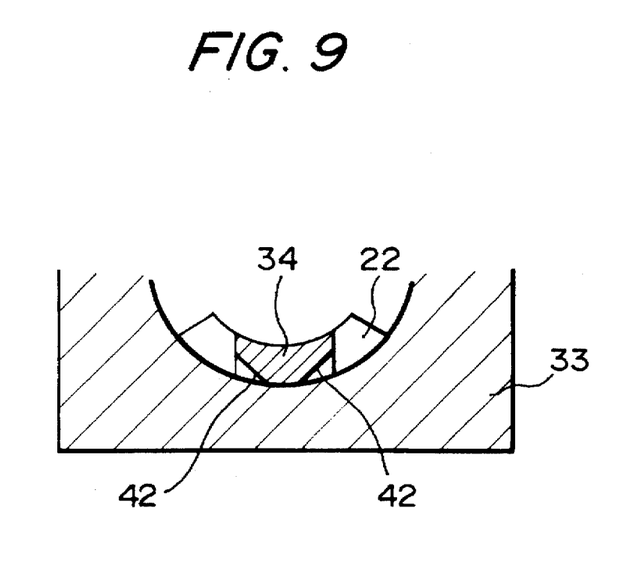
FIG. 9 is a partly sectional view taken along line 9—9 in FIG. 3.

Subsequently, as shown in FIG. 9, a second face-pressing operation is carried out for each narrow section 34. The second face-pressing operation forms chamfers 42 on the side end faces of the narrow section 34. The chamfers 42 define, between the chamfers 42 itself and the inner wall of the lower mold 33, spaces for the molten plastic material when the commutator piece joint body 31 is set in the lower mold 33. Therefore, when the molding process of the commutator holder 21 has been completed, the narrow section 34 is cut into the commutator holder 21, thereby surely preventing the commutator pieces 22 from separating away the commutator holder 21.

Figure 5:
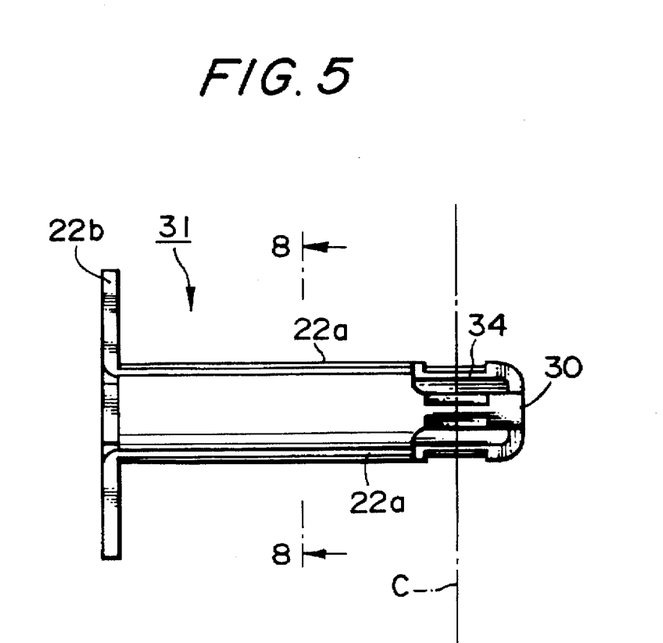
FIG. 5 is a side view of the commutator piece joint body.

After completing the required face-pressing operations, the aforementioned curvature is applied to the contact sections 22a. Then, the terminal section 22b is bent from the contact section 22a, and each commutator piece 22 is bent from the temporary connection 30, so that the commutator pieces 22 are raised from the temporary connection 30. As a result, the commutator piece joint body 31 as shown in FIGS. 4 to 6 can be obtained.

Referring again to FIG. 3, when the obtained commutator piece joint body 31 is set in the lower mold 33, the commutator pieces 22 are brought into close contact with the inner wall of the lower mold 33 by an elastic force by virtue of bending between the commutator piece 22 and the temporary connection 30. This is caused by the fact the commutator piece joint body 31 is bent so that the commutator pieces 22 are radially widened slightly. The bent terminal sections 22b are partly held between the upper and lower molds 32 and 33. The terminal sections 22b held between the upper and lower molds 32 and 33 protrude from the formed commutator holder 21. When the molten plastic material is poured into the upper and lower molds 32 and 33, the molten plastic material flows into the openings 35. The plastic material in the openings 35 securely fix the commutator piece joint body 31 to the commutator holder 21 when the commutator holder 21 has been formed.

Figure 10:
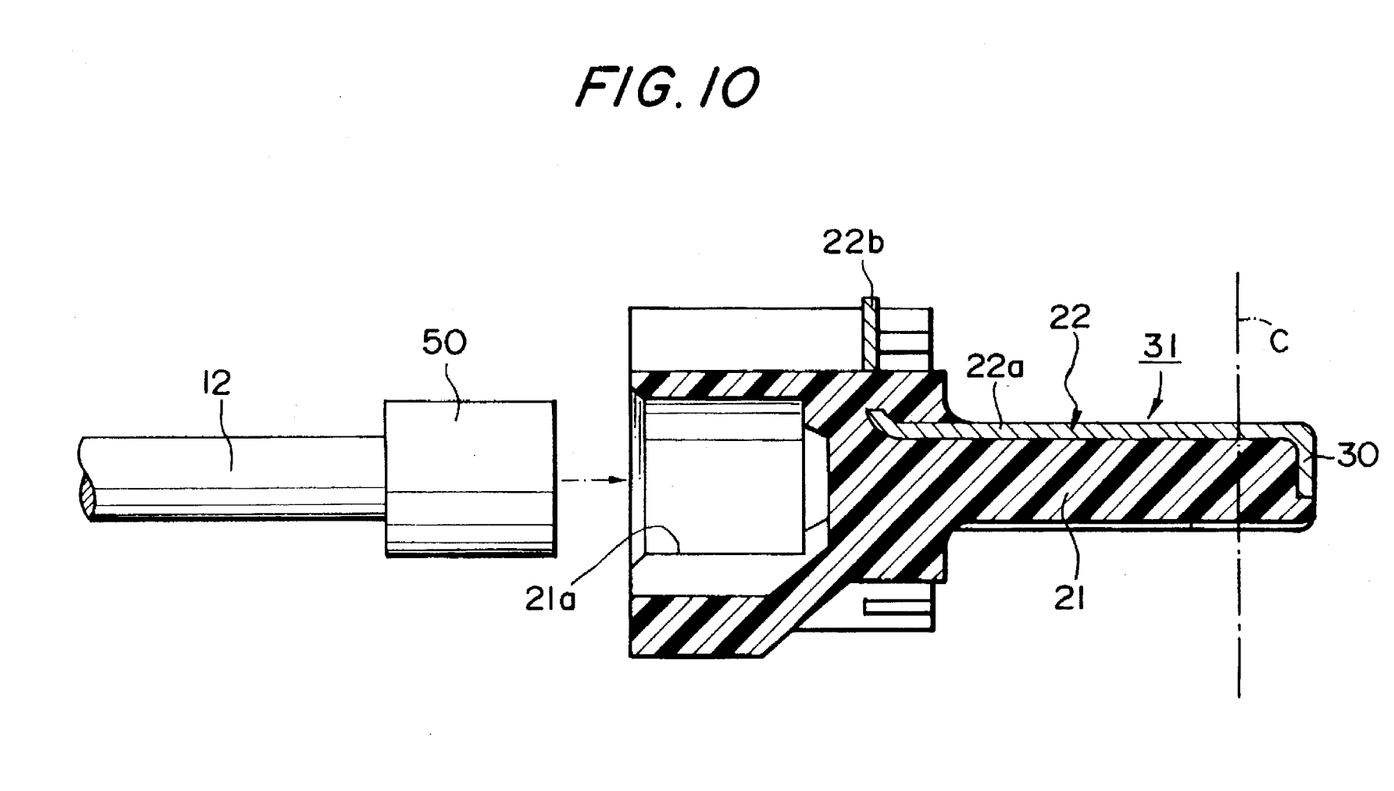
FIG. 10 is a sectional view of the commutator assembly after the molding and before the temporary connection is cut away.
Figure 12:
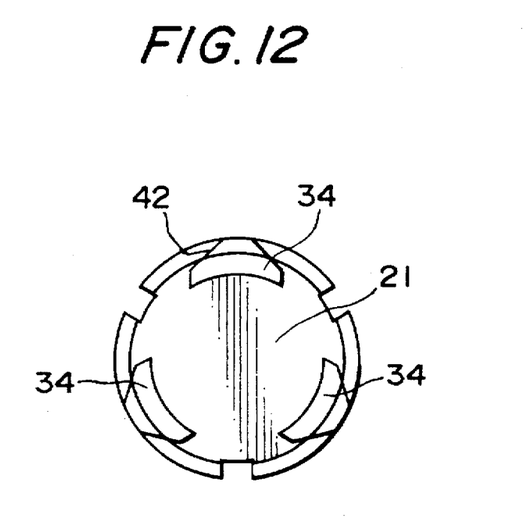
FIG. 12 is an end view of the commutator assembly in the direction of the arrow 12 in FIG. 11.

As shown in FIG. 10, after forming the commutator holder 21, the temporary connection 30 is cut off from each commutator piece 22 along the cutting line C. Thus, the commutator pieces 22 are electrically separated from each other. The cutting-off of the temporary connection 30 is conducted so as to leave the narrow section 34 on the end of the commutator piece 22. In doing so, as shown in FIG. 12, the end of the commutator piece 22 is prevented from separating away from the commutator holder 21 by virtue of the narrow section 34 cutting into the commutator holder 21.

Figure 11:
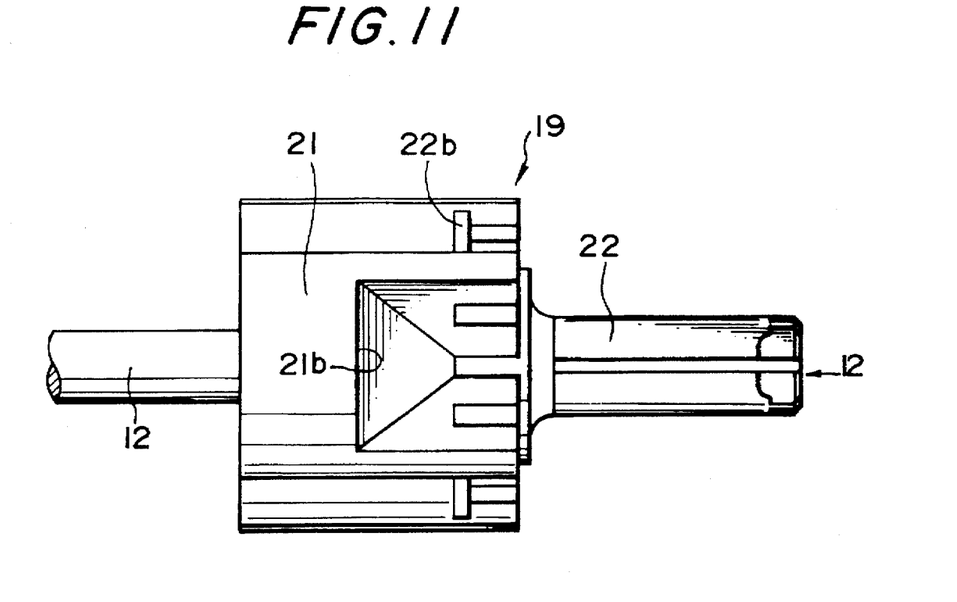
FIG. 11 is a side view of the commutator assembly.
Figure 13:
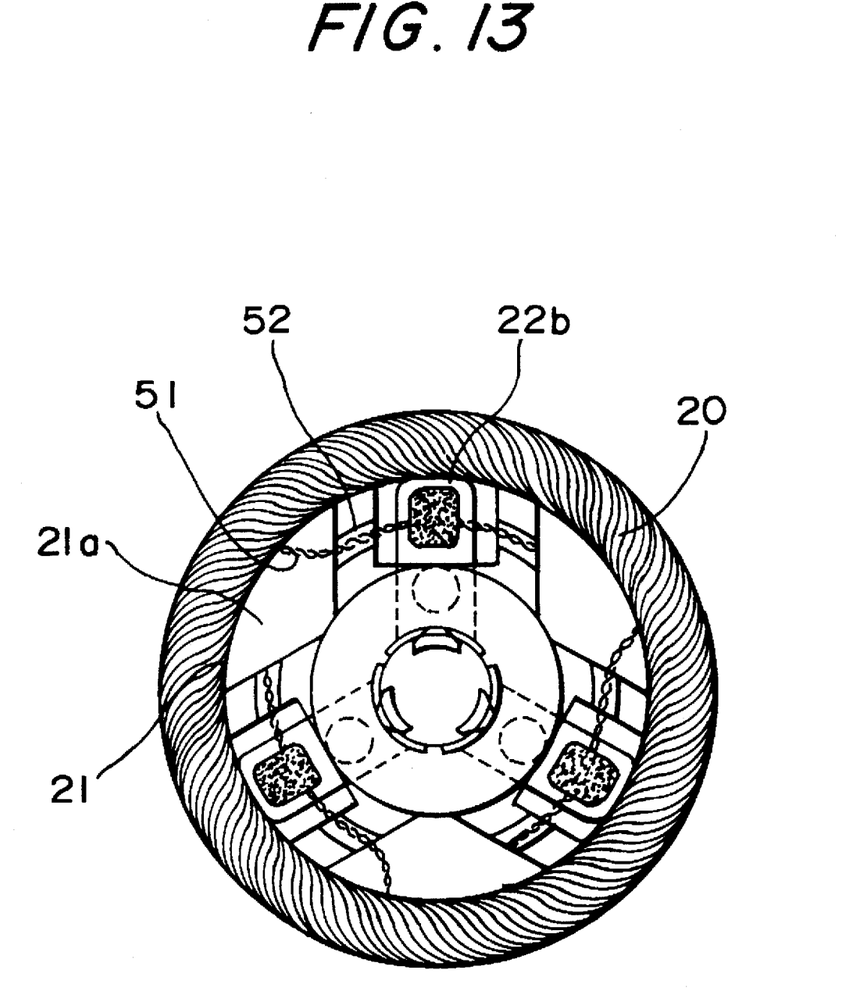
FIG. 13 is an end view of the commutator assembly with a coil mounted.

As shown in FIGS. 10 and 11, the rotor shaft 12 is coupled to the commutator assembly 19 thus produced. The commutator holder 21 is provided with a receiving hole 21a in which a sleeve 50 is received. The rotor shaft 12 is fitted into the sleeve 50. Then, as shown in FIG. 13, the coil 20 is mounted on the commutator assembly 19. The commutator holder 21 has recesses 21b at its outer periphery, and leads 51 of the coil 20 pulled out of the recesses 21b are soldered to the terminal sections 22b of the commutator pieces 22 through lead grooves 52 formed in the wall surrounding the terminal sections 22b.

What is claimed is:

1. A commutator assembly for a small motor, comprising a plurality of commutator pieces for supplying an electric current from a brush fixed to a motor housing to a coil to be rotated together with the rotor shaft of the small motor, and a commutator holder of a plastic material fixed to the rotor shaft for supporting the commutator pieces, said commutator holder having a plurality of recesses located at its outer periphery, wherein said commutator pieces are cut out of a commutator piece joint body which has the commutator pieces radially extending from a single temporary connection and is molded into the commutator holder during molding process.

2. A commutator assembly for a small motor, comprising a plurality of commutator pieces for supplying an electric current from a brush fixed to a motor housing to a coil to be rotated together with the rotor shaft of the small motor, and a commutator holder of a plastic material fixed to the rotor shaft for supporting the commutator pieces, wherein said commutator pieces are cut out of a commutator piece joint body which has the commutator pieces radially extending from a single temporary connection and is molded into the commutator holder during molding process, and said commutator pieces each have a contact section at one end, each of said contact sections have a narrow chamfered section cutting into the commutator holder.

3. A commutator piece joint body to be cut to form commutator pieces for supplying an electric current to a coil on a rotor shaft of a small motor from a brush fixed to a motor housing, said commutator pieces being molded into a commutator holder fixed to the rotor shaft, said commutator piece joint body comprising a single temporary connection and a plurality of commutator pieces radially extending from the single temporary connection, said plurality of commutator pieces each having a contact section, each of said contact sections have a narrow chamfered section, said commutator piece joint body being molded into the commutator holder through the molding process, and said single temporary connection being cut away from commutator pieces after the completion of the molding process to form the commutator pieces electrically separated from one another.

4. The commutator piece joint body according to claim 3, wherein said commutator pieces include contact sections brought into contact with the brushes, and terminal sections formed at free ends of the contact sections to be connected to terminals of the coil.

5. A commutator piece joint body to be cut to form commutator pieces for supplying an electric current to a coil on a rotor shaft of a small motor from a brush fixed to a motor housing, said commutator pieces being molded into a commutator holder fixed to the rotor shaft, said commutator piece joint body comprising a single temporary connection and a plurality of commutator pieces radially extending from the single temporary connection, said commutator pieces include contact sections brought into contact with the brushes, and terminal sections formed at free ends of the contact sections to be connected to terminals of the coil, said terminal sections have openings for preventing heat conductivity when the terminals of the coil are soldered to the terminal sections, said commutator piece joint body being molded into the commutator holder through the molding process, said openings being molded into the commutator holder through the molding process, and said single temporary connection being cut away from commutator pieces after the completion of the molding process to form the commutator pieces electrically separated from one another.

6. The commutator piece joint body according to claim 3, wherein said contact sections are bent to rise from the temporary connection when molded into the commutator holder, said contact sections being in contact with a cylindrical inner wall of the mold when raised.

7. The commutator piece joint body according to claim 3, wherein said commutator pieces are connected to the single temporary connection via narrow sections, and side end faces of the narrow sections being face-pressed to define spaces for a plastic material between an inner wall of the mold and the side end faces so that the narrow sections are cut into the commutator holder by molding.

* * * * *